US007973230B2

(12) United States Patent
Mahowald

(10) Patent No.: US 7,973,230 B2
(45) Date of Patent: Jul. 5, 2011

(54) METHODS AND SYSTEMS FOR PROVIDING REAL-TIME FEEDBACK FOR KARAOKE

(75) Inventor: Peter H. Mahowald, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 12/107,931

(22) Filed: Apr. 23, 2008

(65) Prior Publication Data

US 2009/0165634 A1 Jul. 2, 2009

Related U.S. Application Data

(60) Provisional application No. 61/018,217, filed on Dec. 31, 2007.

(51) Int. Cl.

| | |
|---|---|
| ***A63H 5/00*** | (2006.01) |
| ***G09B 5/00*** | (2006.01) |
| ***A63F 9/24*** | (2006.01) |
| ***G06F 17/00*** | (2006.01) |

(52) U.S. Cl. ........................... 84/609; 434/307 A; 463/7

(58) Field of Classification Search .................... 84/609; 434/307 A; 463/7
See application file for complete search history.

(56) References Cited

U.S. PATENT DOCUMENTS

| | | | | |
|---|---|---|---|---|
| 5,194,682 A * | 3/1993 | Okamura et al. | ......... | 434/307 A |
| 5,929,359 A * | 7/1999 | Sone et al. | ...................... | 84/610 |
| 2005/0255914 A1* | 11/2005 | McHale et al. | ................. | 463/31 |

* cited by examiner

*Primary Examiner* — Jeffrey Donels
*Assistant Examiner* — Andrew R Millikin
(74) *Attorney, Agent, or Firm* — Kramer Levin Naftalis & Frankel LLP

(57) ABSTRACT

Systems and methods for providing real-time feedback to karaoke users are provided. The systems and methods for providing users with real-time feedback while they are singing karaoke generally relate to receiving the user's vocals, determining whether the user is singing on key/pitch and providing real-time feedback to the user while the karaoke song is being sung. The feedback will be positive feedback if user is on key/pitch and it will be negative feedback if user is off key/pitch. For example, the feedback signal if the user is singing too low can be an exaggerated low signal of the user's own voice. This will encourage the user to sing at a higher pitch.

44 Claims, 13 Drawing Sheets

1100

400

500

600

700

900

METHODS AND SYSTEMS FOR PROVIDING REAL-TIME FEEDBACK FOR KARAOKE

CROSS-REFERENCE TO RELATED APPLICATIONS

This application claims priority to Mahowald, U.S. Provisional Patent Application No. 61/018,217, filed Dec. 31, 2007, entitled "Methods and Systems for Providing Real-Time Feedback for Karaoke," the entirety of which is incorporated herein by reference.

BACKGROUND OF THE INVENTION

This invention relates generally to multi-media systems, and more particularly, to systems and methods for assisting people performing karaoke by providing real-time feedback to the user during the playing of the karaoke music track.

Many people love to sing along with their portable music players, stereos, or favorite TV music programs. Karaoke takes the sing-along experience to another level by scrolling the words to the song, synchronized with the music, across the screen, highlighting each word at the exact time it is supposed to be sung to help the singer's timing and rhythm. Some karaoke systems also feature customized music videos for the songs.

A typical karaoke system includes a player for playing karaoke songs, a display, a microphone, and speakers. Karaoke songs are generally recorded on storage media such as optical discs to be played in karaoke players. Some karaoke media contain songs with music only so the karaoke singer is the only one supplying vocals. Other karaoke media contain songs with both music and original vocals, and the karaoke player suppresses the original vocals if a karaoke user is singing into the microphone, so that only the karaoke user's voice is heard through the speakers.

Current karaoke systems, however, do not address one of the biggest obstacles faced by amateur singers: singing on key/pitch. As a result, karaoke users seldom improve the quality of their singing.

SUMMARY OF THE INVENTION

In accordance with various embodiments of the present invention, systems and methods for enabling users to have improved karaoke experiences by providing real-time feedback to those users while they are still performing karaoke are provided.

One embodiment of the present invention, for example, is directed to a method for assisting a user performing karaoke. The method includes receiving the user's voice signals, comparing them with expected voice signals, determining whether the user is singing on key/pitch based on the comparison, and providing real-time feedback to the user while the user is still performing karaoke.

Another embodiment of the present invention, for example, is directed to a system for assisting a user performing karaoke, and the system includes control circuitry, an output device and a microphone. The control circuitry includes processing circuitry and at least one storage device. The control circuitry can be configured to direct the microphone to receive the user's voice signals, compare them with expected voice signals stored in the at least one storage device, determine whether the user is singing on key/pitch based on the comparison, and direct the output device to provide real-time feedback to the user while the user is still performing karaoke.

Another embodiment of the present invention, for example, is directed to a system for assisting a user performing karaoke, and the system includes a user device and a host device remote to the user device. The host device includes control circuitry and communications circuitry. The control circuitry includes processing circuitry and at least one storage device. The control circuitry can be configured to direct the communications circuitry to receive the user's voice signals from the user device, compare them with expected voice signals stored in the at least one storage device, determine whether the user is singing on key/pitch based on the comparison, and direct the communications circuitry to transmit real-time feedback to the user device while the user is still performing karaoke.

For purposes of clarity, and not by way of limitation, the systems and methods can sometimes be described herein in the context of portable electronic device (e.g., MP3 players, mobile phones, handheld computers, etc.) based karaoke and media content compatible with such devices. However, it can be understood that the systems and methods of the present invention can be applied to any other suitable type of devices and media content.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which.

DETAILED DESCRIPTION OF THE PRESENT INVENTION

Figure 1:
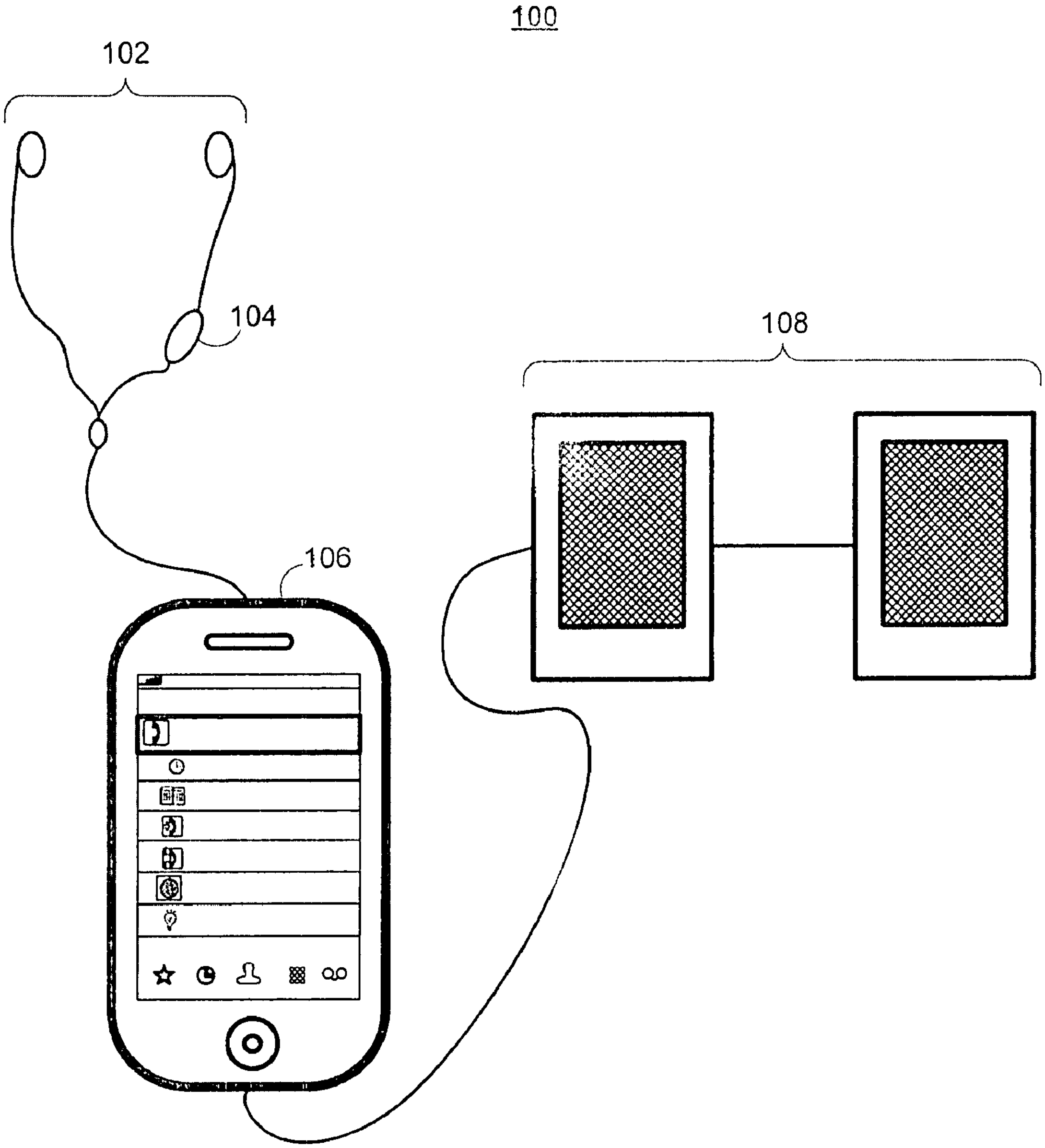
FIG. 1 shows an illustrative schematic diagram that shows a system that can be used to provide karaoke songs to a user in accordance with one embodiment of the invention.

FIG. 1 shows an illustrative schematic diagram of a system 100 that can be used to provide karaoke in accordance with one embodiment of the invention. In particular, system 100 includes portable electronic device 106, earphones 102 which can include microphone 104, and external speakers 108. A karaoke user can use portable electronic device 106 as the karaoke player, listening to karaoke songs through earphones 102 while singing the song into microphone 104. Microphone 104 can pick up the users voice and transmit it to portable electronic device 106. Portable electronic device 106 can perform any necessary processing on the voice, and external speakers 108 can be used to broadcast the voice. While wires are shown connecting earphones 102 and external speakers 108 to portable electronic device 106, these devices can communicate with each other directly or indirectly via wired or wireless paths, such as USB cables, IEEE 1394 cables, Bluetooth, infrared, IEEE 802-11x, etc. BLUETOOTH is a certification mark owned by Bluetooth SIG, INC. Moreover, instead of microphone 104, a microphone internal to portable electronic device 106 can be used (or a completely external microphone can be used provided that the signals generated by the karaoke singer are provided to the voice processor). Instead of external speakers 108, a speaker internal to portable electronic device 106 can be used.

Figure 2:
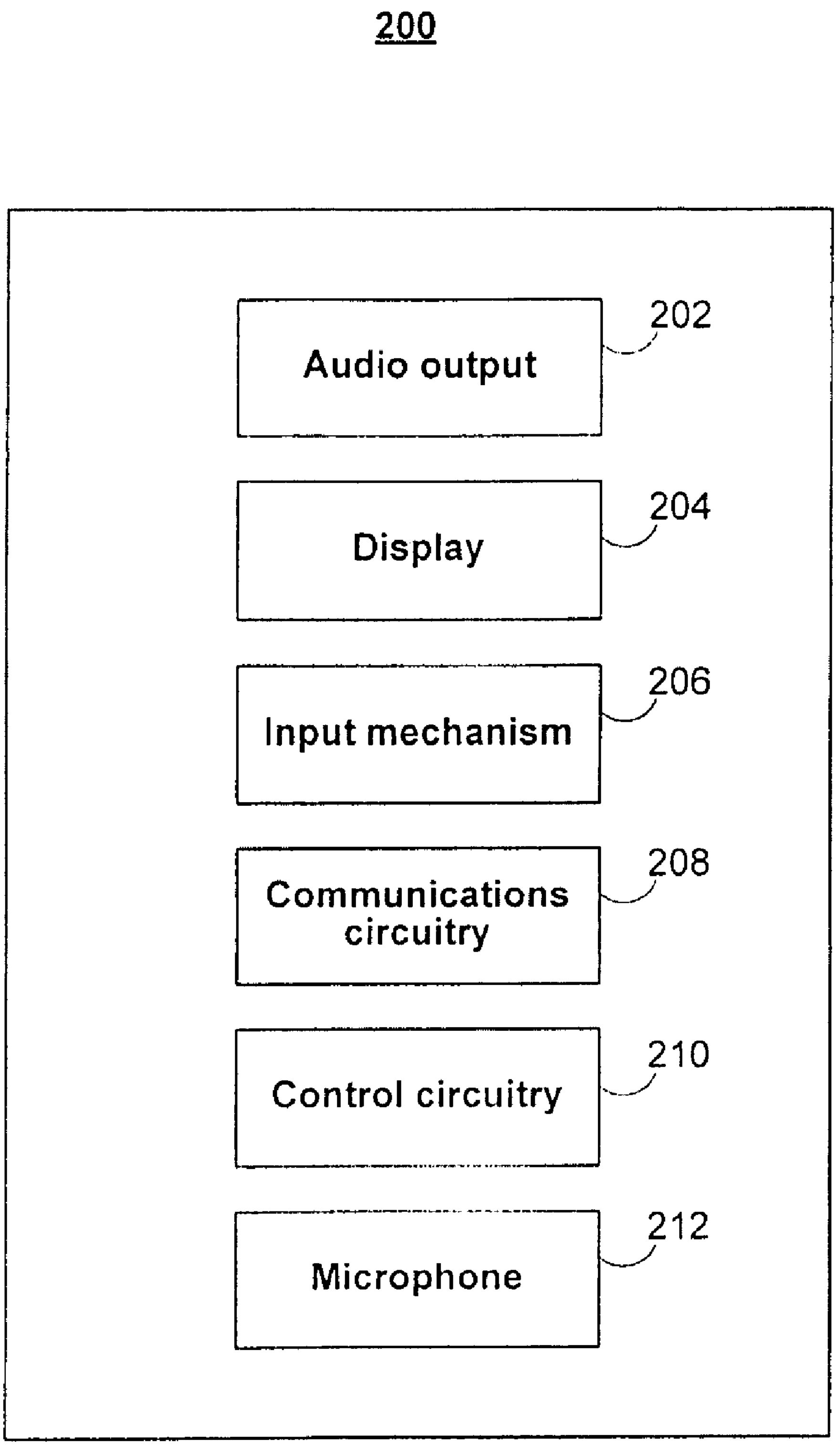
FIG. 2 shows an illustrative block diagram of a device that can be used to provide real-time audible feedback for karaoke in accordance with one embodiment of the invention.

FIG. 2 shows an illustrative block diagram of electronic device 200 that can be used to provide real-time feedback for karaoke to a user in accordance with one embodiment of the invention. Electronic device 200, for example, can be one implementation of portable electronic device 106 of FIG. 1, host device 302 of FIG. 3, or electronic device 306 of FIG. 3. In particular, device 200 can include audio output 202, display 204, input mechanism 206, communications circuitry 208, control circuitry 210 and microphone 212.

Audio output 202 can include a speaker internal to electronic device 200, and/or a connector to attach external speakers, such as speakers 108 (FIG. 1) and/or any other suitable devices for audio output. The audio component of media content played on electronic device 200 can be played through audio output 202.

Display 204 can be a liquid crystal display (LCD) or any other suitable devices for displaying visual images.

A user can interact with electronic device 200 using input mechanism 206. Input mechanism 206 can be any suitable user interface, such as a touch screen, touch pad, keypad, keyboard, stylus input, joystick, track ball, voice recognition interface or other user input interfaces.

Communications circuitry 208 can be used for communication with wired or wireless devices. Communications circuitry 208 can include a cable modem, an integrated services digital network (ISDN) modem, a digital subscriber line (DSL) modem, a telephone modem or a wireless modem/transmitter for communications with other equipment. Such communications can involve the Internet or any other suitable communications networks or paths (described in more detail below in connection with FIG. 3).

Control Circuitry 210 can include processing circuitry and storage (not shown). Control circuitry 210 can be used to dedicate space on, and direct recording of information to, storage devices, and direct output to output devices (e.g., audio output 202, display 204, etc.). Control circuitry 210 can send and receive commands, requests and other suitable data using communications circuitry 208. Control circuitry 210 can be based on any suitable processing circuitry such as processing circuitry based on one or more microprocessors, microcontrollers, digital signal processors, programmable logic devices, etc. In some embodiments, control circuitry 210 executes instructions for an application stored in memory (i.e., storage). Memory (e.g., random-access memory, read-only memory, cache memory, flash memory or any other suitable memory), hard drives, optical drives or any other suitable fixed or removable storage devices can be provided as storage that is part of control circuitry 210. Moreover, storage can include one or more of the above types of storage devices.

Microphone 212 can include a microphone internal to electronic device 200 or it can be external, such as microphone 104 (FIG. 1). Moreover, microphone 212 can also be a connector which can be attached to an external microphone (not shown).

Figure 3:
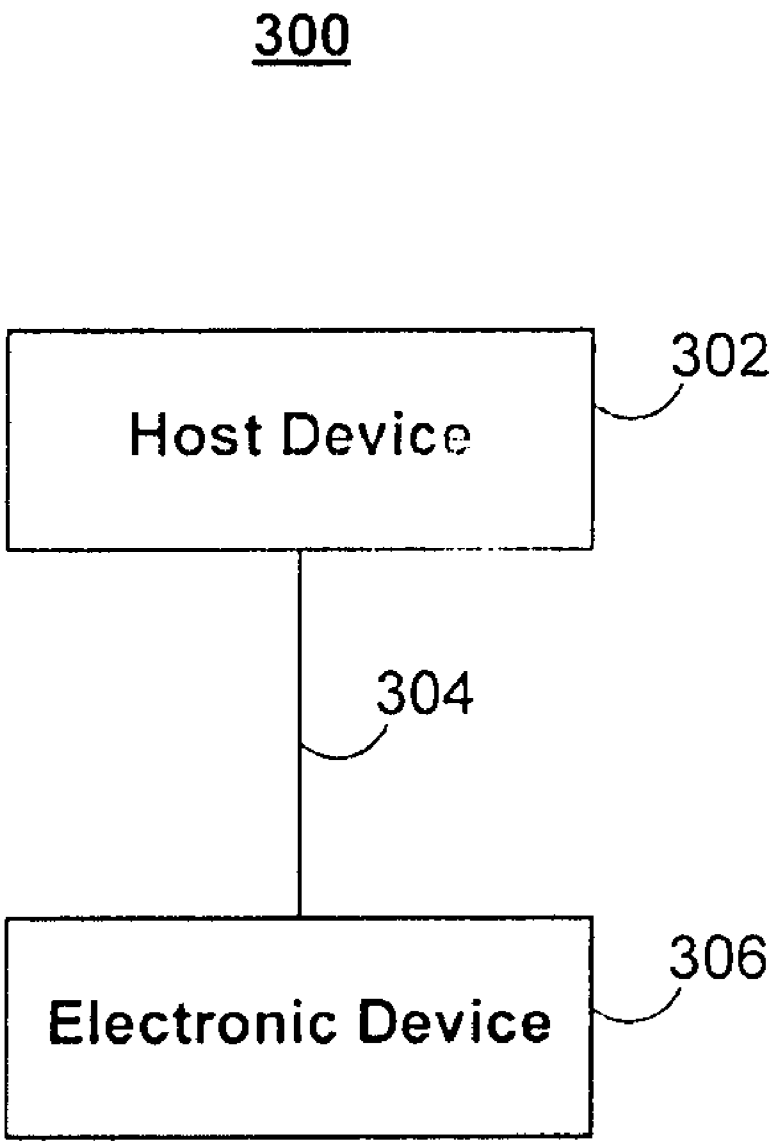
FIG. 3 shows an illustrative block diagram of a system environment in accordance with one embodiment of the invention.

FIG. 3 shows an illustrative system environment 300 in accordance with one embodiment of the invention. In particular, FIG. 3 shows host device 302 connected to electronic device 306 via communications network 304. Host device 302 can be a web server, a database server or any other suitable device that can store, transmit and process information. Electronic device 306 can be a portable electronic device (e.g., mobile phone, portable music player, etc.), a desktop computer, or any other suitable user device that can store, transmit and process information.

Communications network 304 can be one or more networks including the Internet, a mobile phone network, cable network, telephone-based network, or other types of communications network or combinations of communications networks. Communications network 304 can include one or more communications paths, such as, a satellite path, a fiber-optic path, a cable path, a wireless path, or any other suitable wired or wireless communications path or combination of such paths. Electronic device 306 can communicate with host device 302 through communications network 304 using any suitable communications protocol (e.g., HTTP, etc.).

According to one embodiment of the invention, host device 302 can contain a collection of payment-based karaoke songs and electronic device 306 can request karaoke songs from host device 302 and transmit the necessary authentication and/or payment through communications network 304. In response, host device 302 can transmit the requested karaoke songs to electronic device 306 through communications network 304.

Figure 4:
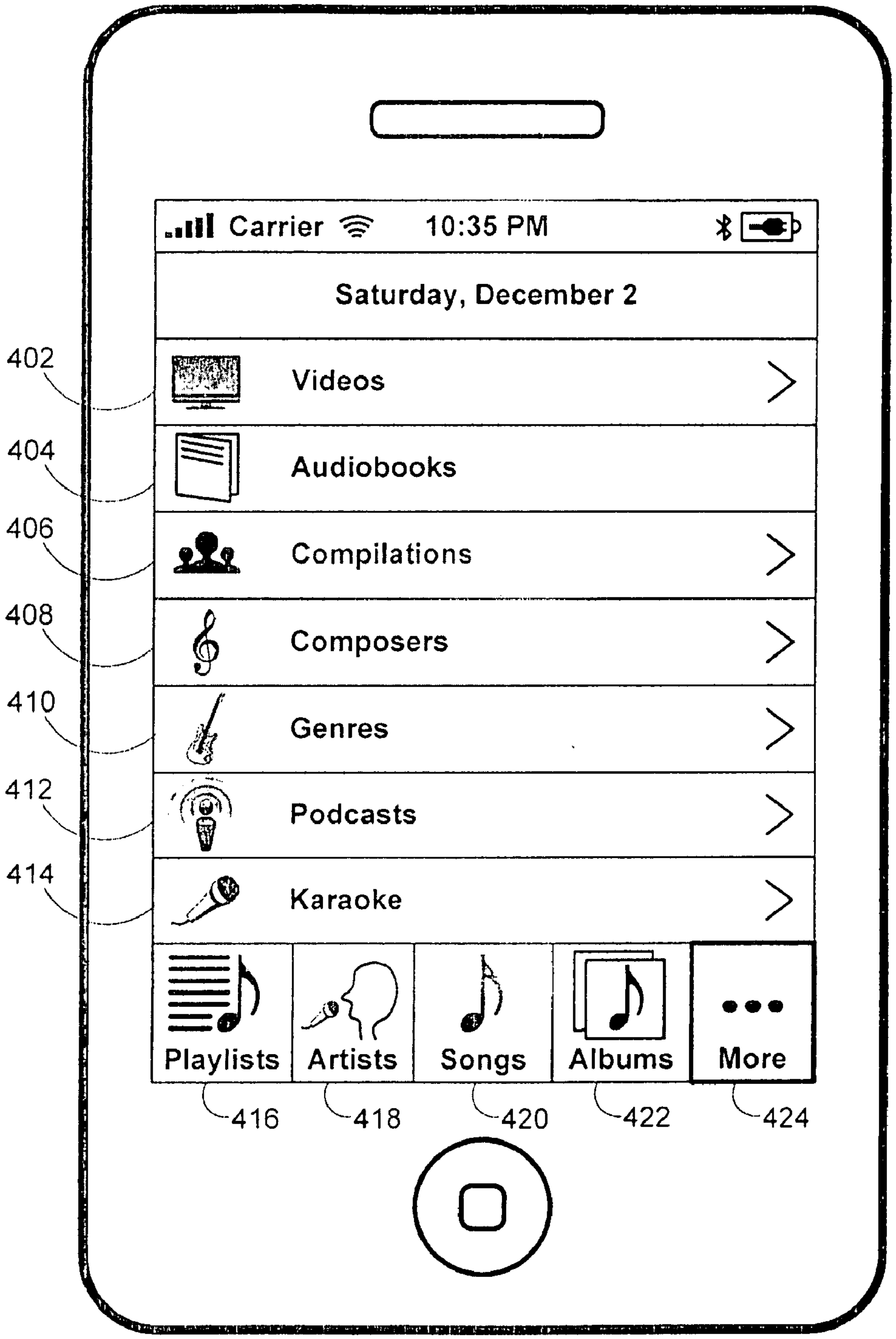
FIGS. 4-7 are illustrative schematic diagrams of displays that can be used in accordance with one embodiment of the invention.

FIG. 4 is an illustrative diagram of display 400 in accordance with one embodiment of the invention. In particular, FIG. 4 shows one example of what can be displayed on an electronic device such as portable electronic device 106 (FIG. 1) with respect to music player functionality. The icons displayed on display 400 can be selected by a user using user interfaces, as discussed in connection with input mechanism 206 (FIG. 2) above. Icon 402, for example, can be selected to access music videos. Icon 404 can be selected to access books or other literature in audio format. Icon 406 can be selected to access musical compilations. Icon 408 can be selected to access music categorized by composers. Icon 410 can be selected to access music categorized by genres. Icon 412 can be selected to access informational broadcasts in an iPod compatible format (IPOD is a trademark of Apple Inc.) which are commonly known as podcasts. Icon 414 can be selected to access karaoke. Icon 416 can be selected to access lists of songs created by a user. Icon 418 can be selected to access music categorized by artists. Icon 420 can be selected to access songs listed in alphabetical order. Icon 422 can be selected to access music categorized by albums. Icon 424 can be selected to access additional features of portable electronic device 106's music player functionality.

Figure 5:
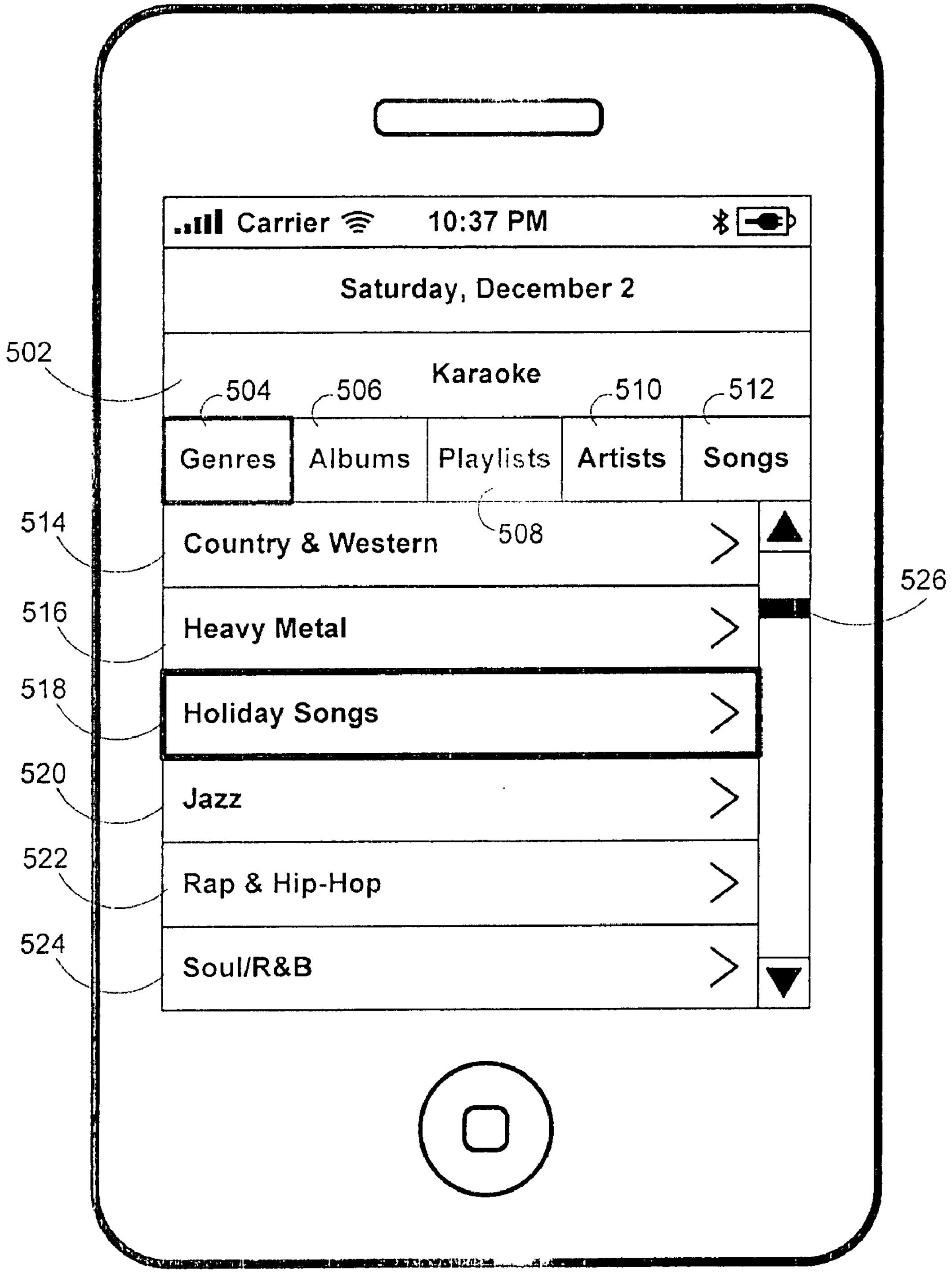

FIG. 5 is an illustrative diagram of display 500 in accordance with one embodiment of the invention. In particular, FIG. 5 shows an example of what can be displayed on an electronic device such as portable electronic device 106 (FIG. 1) after icon 414 (FIG. 4) is selected by the user. Display region 502 can show that karaoke is selected. Icon 504 can be selected by a user to access karaoke songs categorized by genre, while icon 506 can be selected by a user to access karaoke songs categorized by album. Icon 508 can be selected by a user to access lists created by users of karaoke songs. Icon 510 can be selected to access karaoke songs categorized by artist. Icon 512 can be selected to access karaoke songs listed in alphabetical order. In FIG. 5, icon 504 is highlighted to indicate that a user is accessing karaoke songs by genre. Various musical genres as indicated by icons 514, 516, 518, 520, 522 and 524 are displayed. Additional genres can be displayed, for example, by accessing scroll region 526 as shown on the right side of display 500. To access karaoke songs under a particular genre, the name of the genre can be selected using a user interface discussed in connection with input mechanism 206 (FIG. 2). FIG. 5, for example, shows that genre 518 ("Holiday Songs") is selected.

Figure 6:
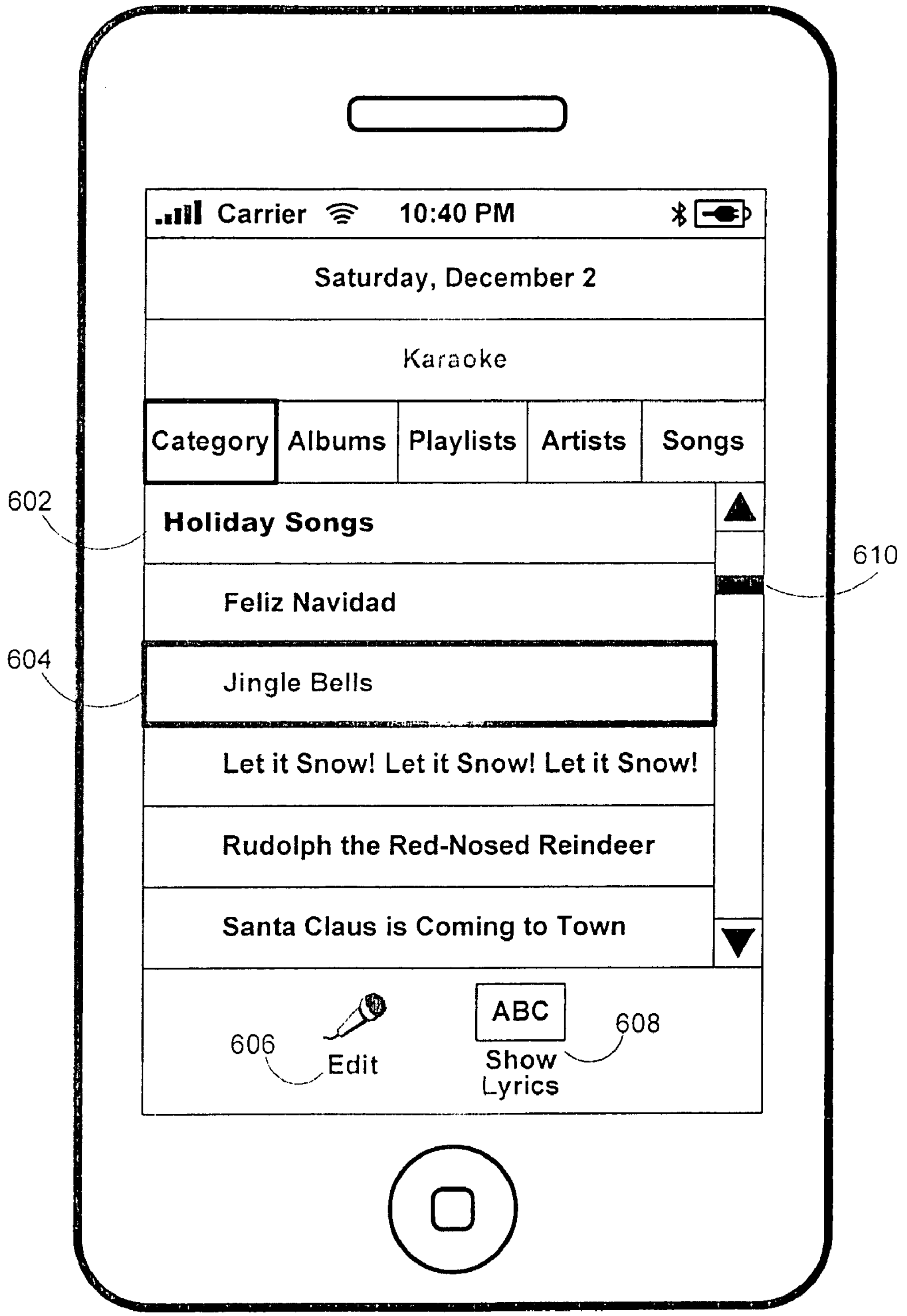

FIG. 6 is an illustrative diagram of display 600 in accordance with one embodiment of the invention. In particular, FIG. 6 shows one example of what can be displayed on an electronic device such as portable electronic device 106 (FIG. 1) after genre 518 ("Holiday Songs") (FIG. 5) is selected. Display region 602 can show that genre "Holiday Songs" is selected and a list of holiday songs for karaoke can be displayed beneath region 602. Additional holiday songs can be displayed by accessing scroll region 610, which appears on the right side of display 600. To access a song, the name of the song can be selected using a user interface such as that discussed above in connection with input mechanism 206 (FIG. 2). FIG. 6 shows that song 604 ("Jingle Bells") is currently selected. Icon 606 can be selected by a user to access a karaoke song editing feature (discussed below in connection with FIG. 9). Icon 608 can be selected to request that the electronic device display lyrics of a selected karaoke song. This feature can be helpful to users who want to learn the words of a song prior to or even after performing karaoke.

Figure 7:
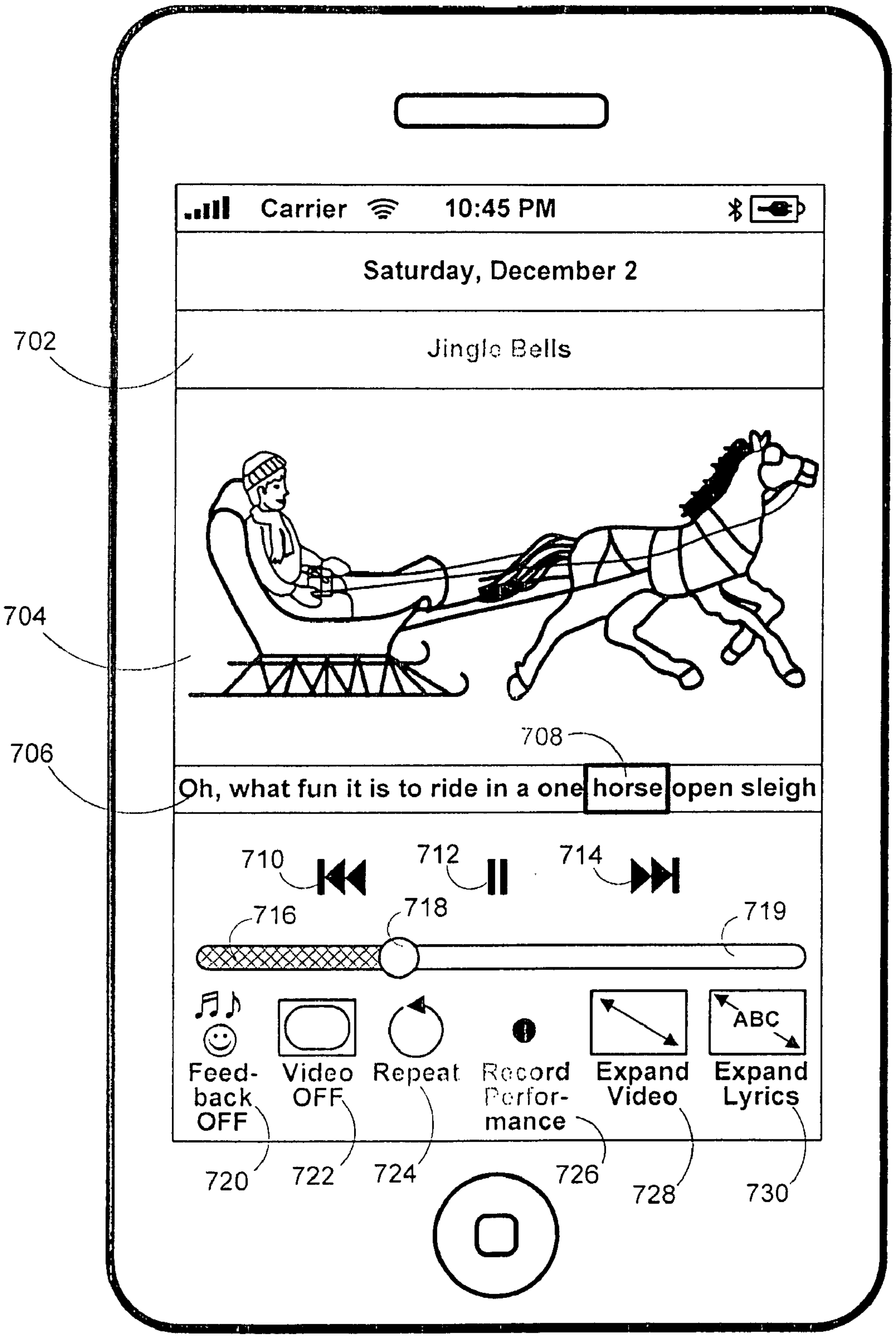

FIG. 7 is an illustrative diagram of display 700 in accordance with one embodiment of the invention. Display region 702 can indicate the current song selection ("Jingle Bells"). Display region 704 shows a video or still digital image that corresponds to the current song selection. A line of lyrics of the current song appears across display region 706 and corresponds to the music being played through, for example, audio output 202 (FIG. 2) (as previously described). Display region 706 can also display multiple lines of lyrics of the song (for example, see the discussion in connection with icon 730 below). Highlight 708 moves across display region 706 and highlights each word as the corresponding music is played and that word is supposed to be sung. This feature allows the user to sing the song with the correct tempo or pace. The lyrics displayed in display region 706 can be, for example, the original ones or creative ones by the user.

Icon 710 can be selected to replay portions of the song. Icon 712 can be selected to pause a song. When a song is paused, icon 712 can turn into a right-pointing arrow to indicate that the user can select it to resume the song. When a song is first selected, icon 712 can show a right-pointing arrow to indicate that the user can select it to start playing the song. Icon 714 can be selected to forward to portions of the song. Indicator 719 can graphically represent the length of the selected song. Indicator 718 can move along indicator 719 as a song plays to show how much of the song currently being played has been played. Shaded region 716 can represent the portion of a song that has been played, while the non-shaded portion of indicator 719 can show the amount of the song remaining. As a user selects icons 710, 712 or 714 to replay, pause, or fast forward the song, indicator 718 respectively moves back, stops, or moves forward in response to keep track of the location of the portion of the song currently being played or to be played relative to the entire length of the song.

Icon 720 can be selected to turn the real-time feedback feature (described below in connection with FIG. 13) ON or OFF. When the feedback feature is on, icon 720 can show "Feedback OFF" to indicate that a user can turn feedback off by selecting the icon. When feedback feature is off, icon 720 can show "Feedback ON" to indicate that a user can turn feedback on by selecting the icon. Icon 720 can be "grayed out" to indicate that the feedback feature is not available for a given song. Icon 722 can be selected to turn a video ON or OFF. When a video is playing, icon 722 can show "Video OFF" to indicate that a user can turn the video off by selecting the icon. When a video is not playing, icon 722 can show "Video ON" to indicate that a user can turn the video on by selecting the icon. Icon 722 can be "grayed out" to indicate that video is not available for a given song. Icon 724 ("Repeat") can be selected by a user to play a song continuously.

Icon 726 ("Record Performance") can be selected to record a user's rendition of a song through microphone 212 onto control circuitry 210's storage (FIG. 2). The recorded song can be analyzed to help a user improve his or her singing. Icon 728 ("Expand Video") can be selected to change the size of video display in display region 704. For example, icon 728 can be selected to expand the video display to fill display 204 (FIG. 2). When the video expands to fill display 204 (FIG. 2), it can be displayed in a landscape view (i.e., sideways) on display 204. Icon 730 ("Expand Lyrics") can be selected to change the size of the lyrics display in display region 706. For example, it can expand the lyrics display to include multiple lines of lyrics.

Figure 8:
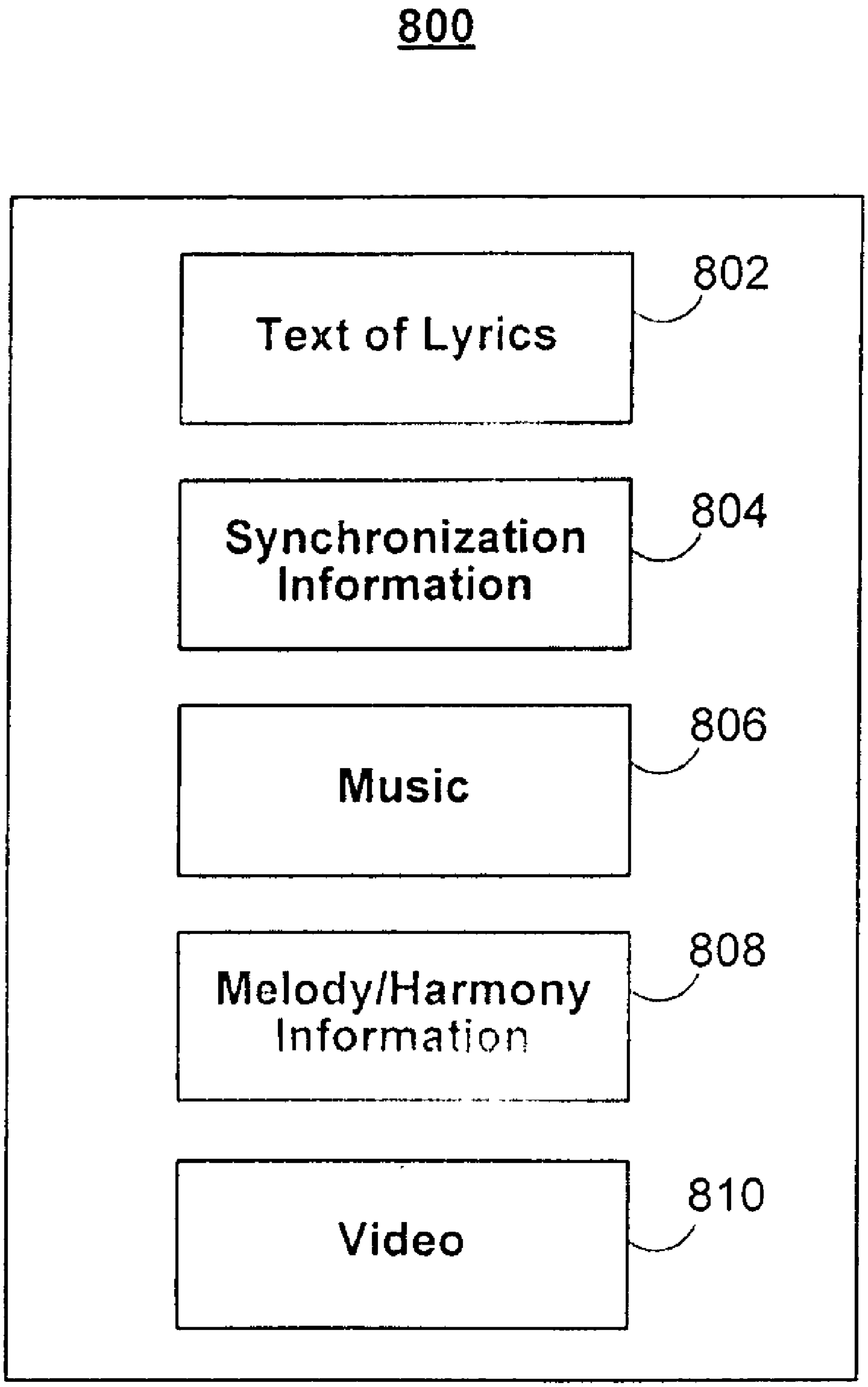
FIG. 8 is an illustrative block diagram of the structure of a karaoke song in accordance with one embodiment of the invention.

FIG. 8 is an illustrative block diagram that shows the structure of a karaoke song in accordance with one embodiment of the invention. In particular, FIG. 8 shows elements of data structure 800 of a karaoke song for an electronic device such as portable electronic device 106 (FIG. 1). Element 802 can contain the text of lyrics of a karaoke song, for example, in ASCII format (any format for the lyrics can be used without departing from the present invention). Element 804 can contain synchronization information which can be used to synchronize various elements of data structure 800, such as synchronizing text of the lyrics to music. Element 806 can contain the music of a song in MP3 or any other suitable format. Element 808 can contain melody/harmony information (discussed below in connection with FIG. 12) of the song. Melody/harmony information can be based on the voice of an original artist singing a song, on the music of a song, or on any other suitable audible representation of a song. Element 810 can contain, if available, video that corresponds to a song in QuickTime or any other suitable format. QUICKTIME is a trademark of Apple Inc. Original vocals, if available, can be a track in element 806 or can be a separate element (not shown).

Figure 9:
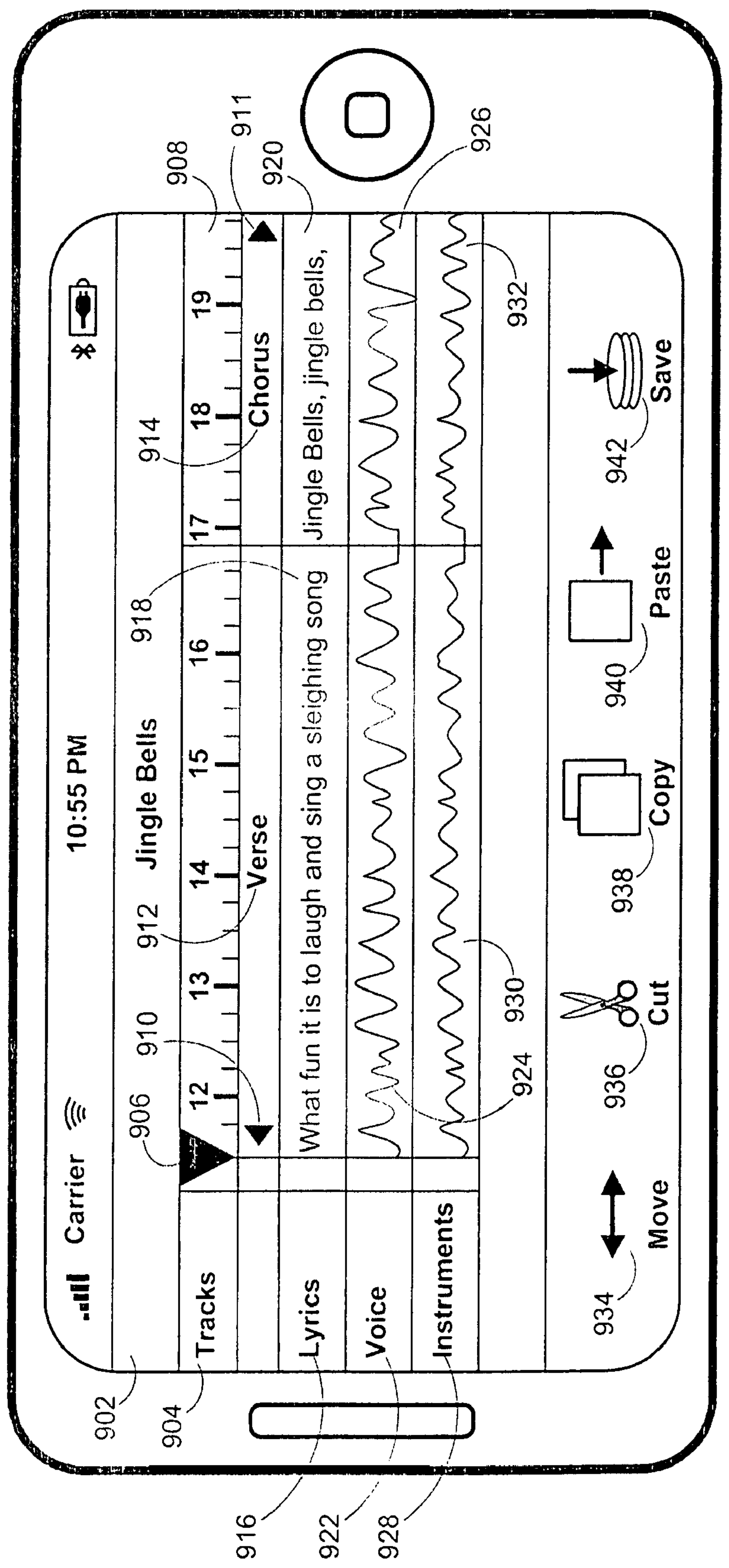
FIG. 9 is an illustrative schematic diagram of a display that can be used in accordance with one embodiment of the invention.

FIG. 9 is an illustrative schematic diagram of display 900 in accordance with one embodiment of the invention. In particular, FIG. 9 shows display 900 which can be used to display or edit components of a song, such as adding lyrics (e.g., the original ones or creative ones by the user). The displaying or editing can be performed, for example, by control circuitry 210 (FIG. 2) under the control of the instructions of a music editing application. Music editing applications, such as GarageBand, are commonly known. GARAGEBAND is a trademark of Apple Inc. Display 900 can be accessed by selecting icon 606 (FIG. 6) from display 600. Display region 902 can show the title of the song ("Jingle Bells") currently being displayed/edited. Display regions 904, 916, 922 and 928 can show the type of information displayed in display regions 908, 920, 926 and 932, respectively. Cursor 906 can indicate the current location within a song where the next editing operation can take place. The user can hold and drag the cursor using an input such as input mechanism 206 (FIG. 2) to select a portion of a song. The selected portion can be indicated using highlight, shading or any other suitable indication. Arrows 910 and 911 can be used to scroll the display to show different portions of the selected song. Display region 908 can show a time scale in seconds (or other units of time) that corresponds to the progress of the song. Display regions 912 and 914 can indicate components of a song (e.g., verse and chorus). Display 920 can show lyrics 918 of the song that correspond to the time scale in display region 908. Display region 926 can show a voice signal as a waveform 924 that corresponds to lyrics 918 of display region 920. The voice can be the voice of an original artist (for a karaoke song with vocals), expected voice based on melody/harmony information from the song (described in connection with FIG. 12 below), or the voice of a user recorded by portable electronic device 106, for example, by selecting icon 726 ("Record Performance") of FIG. 7. Display region 932 can show the music signal as a waveform 930 that corresponds to lyrics 918 of display region 920.

Icons 934, 936, 938 and 940 can be selected to edit a song. Icon 934 ("Move") can be selected to rearrange the position of a selected portion of a song. Icon 936 ("Cut") can be selected to cut a particular portion of a song. Icon 938 ("Copy") can be selected to copy a particular portion of a song. Icon 940 ("Paste) can be selected to paste the contents of a previous cut or copy operation to a location indicated by cursor 906. Icon 942 can be selected to save edits to a song to storage, such as control circuitry 210's storage (FIG. 2).

Figure 10:
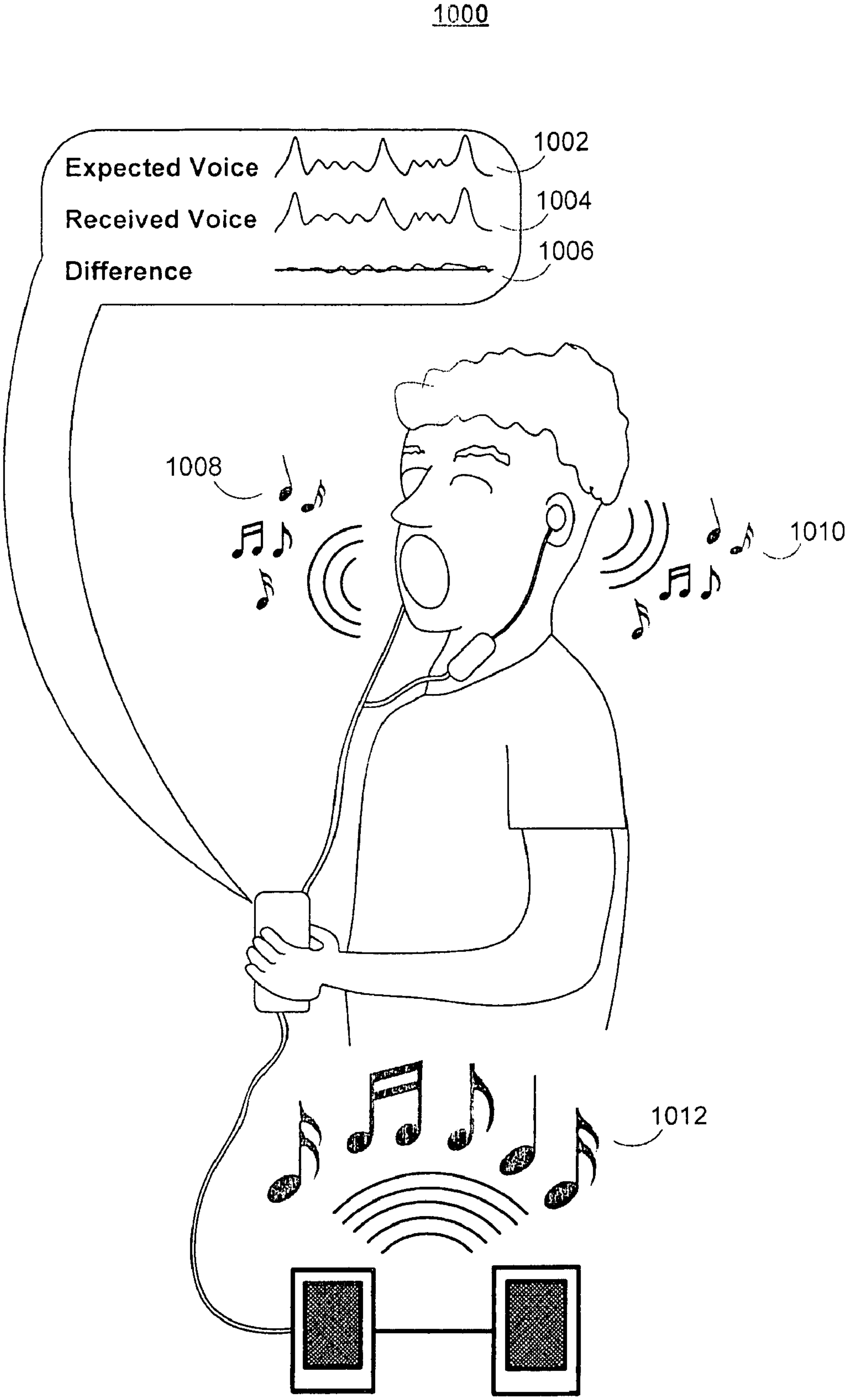
FIG. 10 is an illustrative diagram showing positive real-time feedback that can occur when a user sings on key/pitch in accordance with one embodiment of the invention.

FIG. 10 is an illustrative diagram 1000 showing how positive real-time feedback is provided to a user when the user sings on key/pitch in accordance with one embodiment of the invention. After the karaoke song selected in FIG. 6 starts to play on an electronic device such as portable electronic device 106 (FIG. 1), the user can listen to the music (e.g., as shown by waveform 930 in display region 932 of FIG. 9) through speakers such as earphones 102 and sing the lyrics to the music into a microphone such as microphone 104 (FIG. 1). Control circuitry 210 can receive the user's voice signals through microphone connection 212 (FIG. 2) and compare those signals to the expected voice signal (shown by waveform 924 in display region 926 of FIG. 9).

The expected voice signal can be an element of the karaoke song containing melody/harmony information such as element 808 (FIG. 8). Expected voice signals can be based on the music of a song as recorded, the vocals of an original artist, or any other suitable audible representation of a song. Using the vocals of a particular artist as the basis for the expected voice can be helpful when a user wants to imitate the singing style of that artist. When an original artist's vocals provide the main rhythm of a song (e.g., a rap song), the vocals of the original artist can be the only basis for the expected voice. More than one expected voice can be available, for example, when there are renditions of the song by multiple artists. Portable electronic device 106 can present the user with options to choose the expected voice, if more than one option for expected voice is available for a karaoke song.

Control circuitry 210 can calculate the difference between a user's voice signal and an expected voice signal. Conventionally the signal processing can be applied at a desktop computer. It can also be done on any computer on the network, or in a data storage device normally used for backup; often the control circuitry in these devices while slower is still capable of significant processing, especially considering that the storage device is often left on at all times. A network server can also do the computations automatically during idle times or when requested to by a web page. If control circuitry 210 calculates a small difference, the user must be singing on key/pitch, so control circuitry 210 can provide real-time positive audio feedback through audio output 202. Techniques for comparing two voice signals are commonly known. For example, a technique can involve control circuitry 210 converting the user's voice signal into spectral representation 1004 and comparing it to spectral representation 1002 of the expected voice signal. One algorithm for comparing the spectral representations is to find the frequency difference between the peaks of the energy vs. frequency curves for the actual and expected voice signals. Another algorithm for comparing the spectral representations is to find the difference in the centroid of the actual voice signal from the data for the expected voice signal. If control circuitry 210 calculates a small difference (e.g., waveform 1006 has a near zero difference), which can indicate that the user is singing on key/pitch, then control circuitry 210 can process user's voice 1008 to enhance it, for example, by giving it a pleasant concert hall echo. Control circuitry 210 can output the enhanced voice through audio output 202 (FIG. 2) so that the user singing on key/pitch can receive real-time, positive audible feedback signals 1010 through earphones 102 and others can hear enhanced vocals 1012 which can be provided through external speakers 108 (FIG. 1). Techniques that enhance a user's voice are commonly known.

Figure 11:
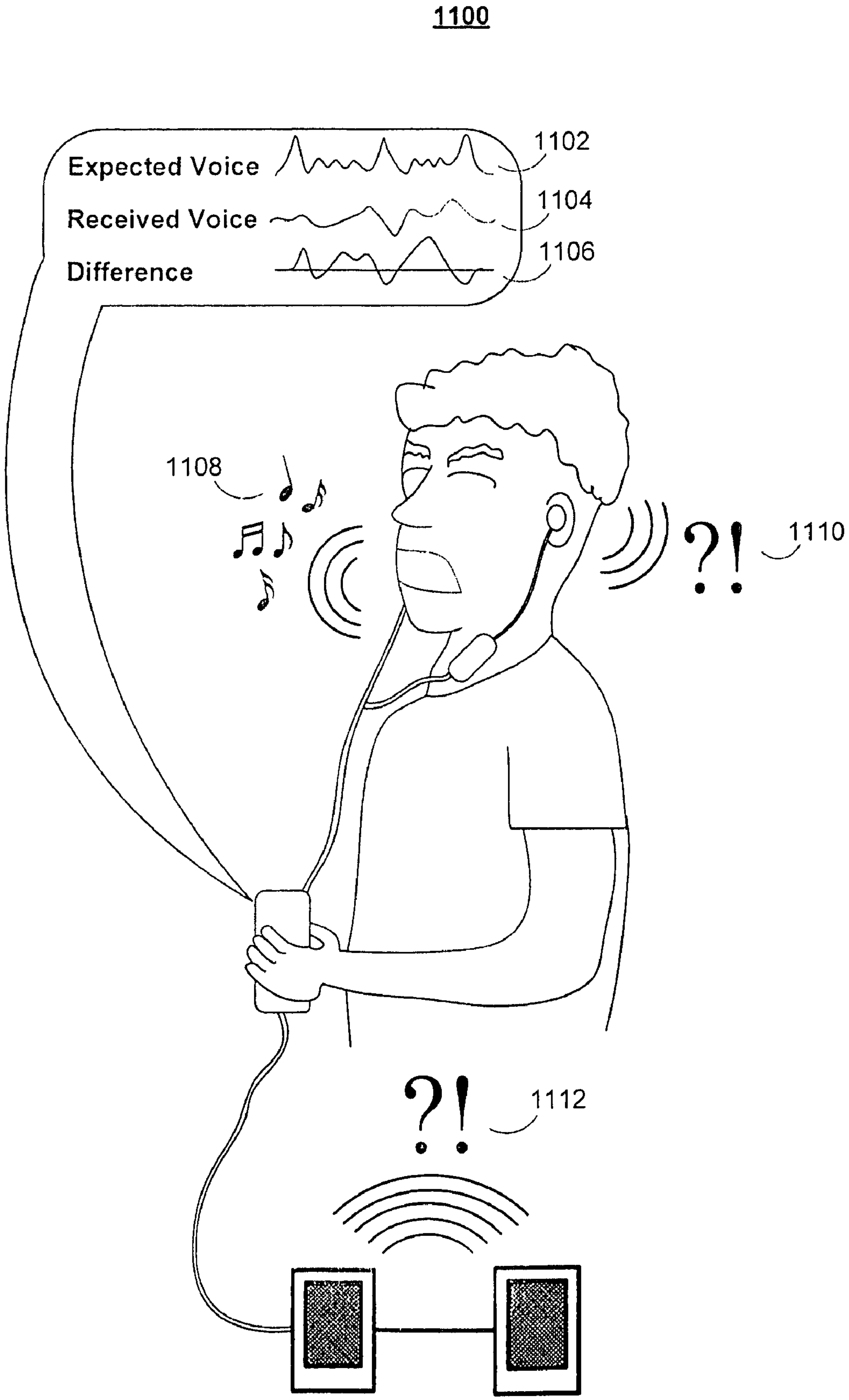
FIG. 11 is an illustrative diagram showing negative real-time feedback that can occur when a user sings off key/pitch in accordance with one embodiment of the invention.

FIG. 11 is an illustrative diagram 1100 showing how negative real-time feedback can be provided to a user when the user sings off key/pitch in accordance with one embodiment of the invention. After the karaoke song selected in FIG. 6 starts to play on an electronic device such as portable electronic device 106, the user can listen to the music (shown by waveform 930 in display region 932 of FIG. 9) output by audio output 202 (FIG. 2) through speakers such as earphones 102 and sing the lyrics to the music into a microphone such as microphone 104 (FIG. 1). Control circuitry 210 can receive the user's voice signals through microphone connection 212 (FIG. 2) and compare those signals to the expected voice signal (shown by waveform 924 in display region 926 of FIG. 9).

Control circuitry 210 can calculate the difference between a user's voice signal and an expected voice signal. If control circuitry 210 calculates a big difference, the user must be singing off key/pitch, so control circuitry 210 can provide real-time negative audio feedback through audio output 202. For example, a technique can involve control circuitry 210 converting the user's voice signal into spectral representation 1104 and subtracting spectral representation 1102, measured as the peak in the energy vs. frequency curve from the stored data for the expected voice frequency. If control circuitry 210 calculates a big difference (e.g., waveform 1106 has a big amplitude), which can indicate that the user is singing off key/pitch, then control circuitry 210 can process user's voice 1108 to exaggerate it. For example, if the user is singing 20 Hz high, the voice signal can be changed to 60 Hz high. Control circuitry 210 can output the exaggerated voice through audio output 202 so that the user singing off key/pitch can receive real-time, negative audible feedback 1110 through earphones 102 (FIG. 1) and others can hear exaggerated vocals 1112 through external speakers 108 (FIG. 1). Alternately, control circuitry 210 can modify the pitch of the singer's voice back to the expected pitch. Alternately, the control circuitry can "fuzz" the singer's voice to the audience, so it is harder to notice the off pitchedness, while giving the karaoke singer the negative feedback (e.g., exaggerating the off pitchedness) to help the singer more easily notice that he/she is off key/pitch. Techniques that modify a user's pitch or fuzz a user's voice are commonly known.

Other types of real-time feedback, such as real-time visual feedback, can be provided. For example, symbols can be displayed above the text of the lyrics in display region 706: small up-pointing arrows to show that the user can sing slightly higher, small down-pointing arrows to show that the user can sing slightly lower, large up-pointing arrows to show that the user can sing a lot higher, a smiley face to show that the user is singing on key/pitch, etc.

Feedback provided can be real-time adaptive feedback. For example, if a user changes from singing off key/pitch to singing on key/pitch while performing a karaoke song, control circuitry 210 can change from providing real-time negative feedback to providing real-time positive feedback in response. If the user changes from singing on key/pitch to singing off key/pitch, control circuitry 210 can change from providing real-time positive feedback to providing real-time negative feedback in response.

Figure 12:
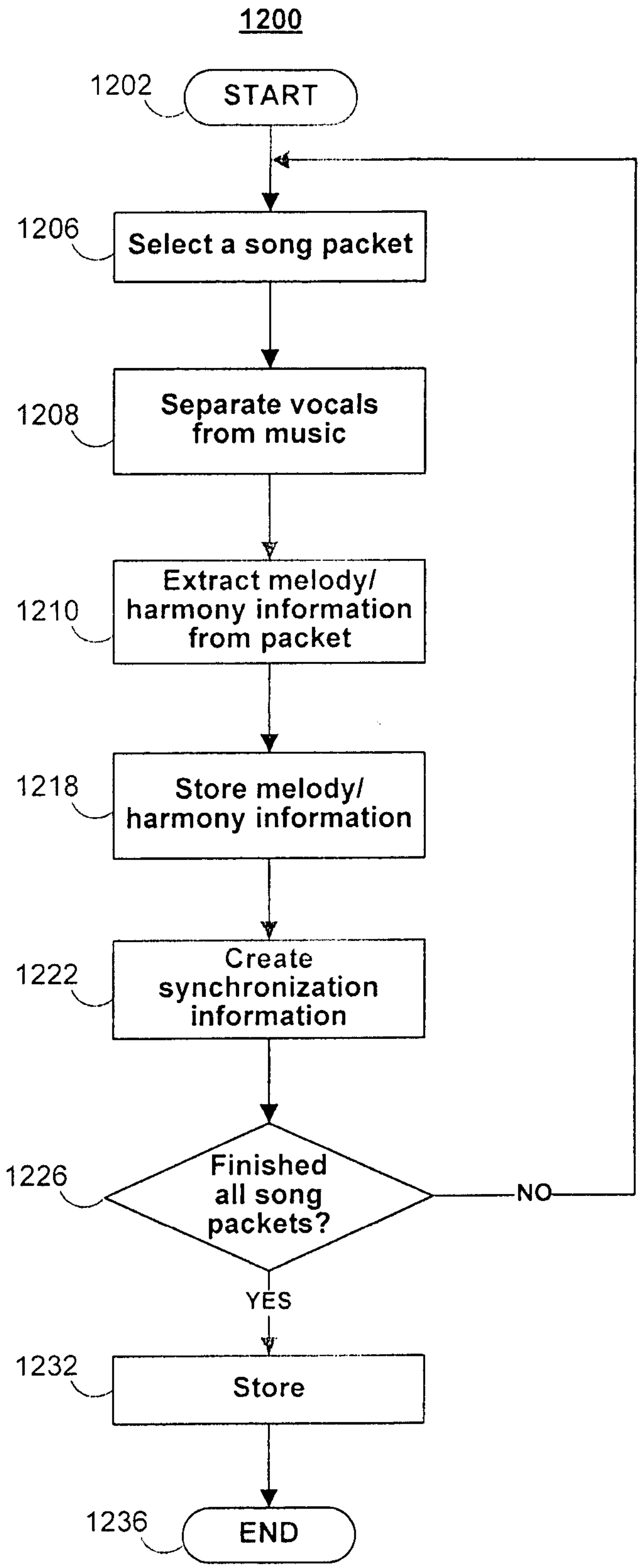
FIG. 12 is an illustrative process flow chart of steps that can be involved in creating a karaoke song in accordance with one embodiment of the invention.

FIG. 12 is an illustrative process flow chart 1200 of steps involved in creating a karaoke song in accordance with one embodiment of the invention. Step 1202 indicates start of the process. The process can start with a song in digital format. In step 1206, control circuitry 210 of an electronic device such as portable electronic device 106 can select a song packet from a song in control circuitry 210's storage (FIG. 2). A song packet can be a portion of a song or an entire song. In step 1208, control circuitry 210 (FIG. 2) can separate original vocals from music or remove original vocals, if necessary. Commonly known techniques exist for separating vocals and music into separate tracks and for removing vocals. In step 1210, control circuitry 210 (FIG. 2) can extract melody/harmony information from the song packet. Techniques for analyzing and extracting melody/harmony information from music are commonly known. See, for example, http://www.ee.columbia.edu/~dpwe/pubs/Ellis06-musicinfo-cacm.pdf. Melody/harmony information can be extracted from music of a song or from original vocals of a song. Melody/harmony information extracted from original vocals can be helpful when the user wants to sing more like the artist rendering the original vocals. In step 1218, control circuitry 210 can store melody/harmony information 808 with music 806, and if available, video 810 for the song (FIG. 8) in storage of control circuitry 210 (FIG. 2). In step 1218, control circuitry 210 (FIG. 2) can add the vocals of an original artist that correspond with the packet being processed to create a karaoke song with vocals. In step 1218, control circuitry 210 can add lyrics 802 (e.g., the original ones or creative ones by the user). In step 1222, control circuitry 210 (FIG. 2) can create synchronization information 804 that can synchronize text of lyrics 802 with music 806. Techniques for synchronizing text of lyrics with music to make a karaoke song are well known. Since melody/harmony information was extracted from the song, it is already synchronized to the music.

Synchronized lyrics, melody/harmony information and music can be graphically represented on portable electronic device 106 as shown by FIG. 9. Portions of melody/harmony information that correspond to music-only, no-lyrics parts of the song can be removed to conserve storage space. In step 1226, control circuitry 210 (FIG. 2) can determine whether all song packets have been processed. If YES, in step 1232, control circuitry 210 can store the karaoke song created according to the format of data structure 800 (FIG. 8) in control circuitry 210's storage (FIG. 2), and step 1236 indicates end of the process. If NO, in step 1206, control circuitry 210 (FIG. 2) can select the next song packet to continue the process.

The process flow steps discussed in connection with FIG. 12 can be applied to extract melody/harmony information from a karaoke user's voice in real-time, for example, to create waveform representations 1004 (FIG. 10) and 1104 (FIG. 11).

The steps of FIG. 12 can be performed by portable electronic device 106 (FIG. 1), electronic device 306 (FIG. 3), host device 302 (FIG. 3), or any other suitable device or any combination of such devices.

Figure 13:
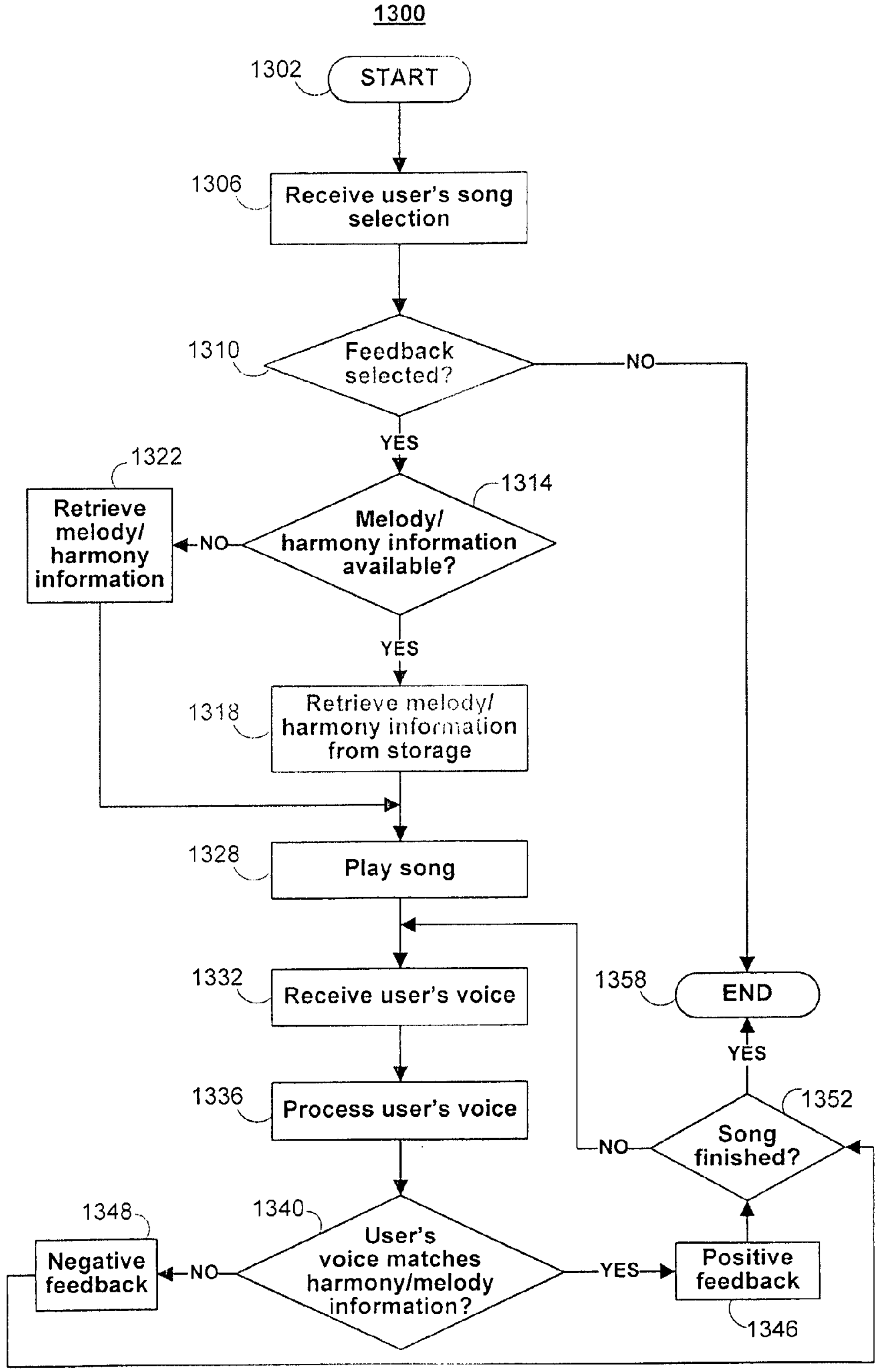
FIG. 13 is an illustrative process flow chart of steps that can be involved in providing real-time feedback for karaoke in accordance with one embodiment of the invention.

FIG. 13 is an illustrative process flow chart 1300 of steps involved in providing real-time feedback for karaoke in accordance with one embodiment of the invention. Step 1302 indicates start of the process. In step 1306, control circuitry 210 can receive a user's karaoke song selection through input mechanism 206 (FIG. 2). In step 1310, control circuitry 210 can determine whether the user selected real-time feedback (for example, by accessing icon 720 of FIG. 7). If NO, step 1358 indicates end of the process. If YES, in step 1314, control circuitry 210 (FIG. 2) can determine whether melody/harmony information (e.g., FIG. 8 element 808) for the song is available. If NO, in step 1322, control circuitry 210 (FIG. 2) can retrieve melody/harmony information (e.g., using the process flow discussed in connection with FIG. 12). If YES, in step 1318, control circuitry 210 can retrieve melody/harmony information 808 (FIG. 8) from storage of control circuitry 210 (FIG. 2). In step 1328, control circuitry 210 can play the song through audio output 202, and video corresponding to the song, if available, on display 204 (FIG. 2). In step 1332, control circuitry 210 (FIG. 2) can obtain user's voice through, for example, microphone 104 (FIG. 1) and convert it to digital format. Signal processing techniques for converting analog sounds into digital format are well known. In step 1336, control circuitry 210 (FIG. 2) can process user's vocals by, for example, extracting melody/harmony information from it (e.g., using the process flow discussed in connection with FIG. 12). In step 1340, control circuitry 210 (FIG. 2) can compare melody/harmony information of user's voice to melody/harmony information 808 (FIG. 8) of the karaoke song to determine whether the user is singing on key/pitch. If YES, in step 1346, control circuitry 210 (FIG. 2) can provide real-time, positive feedback (e.g., discussed in connection with FIG. 10) through an output device (e.g., audio output 202 of FIG. 2, display 204 of FIG. 2, etc.). If NO, in step 1348, control circuitry 210 (FIG. 2) can provide real-time, negative feedback (e.g., discussed in connection with FIG. 11) through an output device (e.g., audio output 202 of FIG. 2, display 204 of FIG. 2, etc.). In step 1352, control circuitry 210 (FIG. 2) can determine whether the song is finished. If YES, step 1358 indicates end of the process. If NO, in step 1332, control circuitry 210 (FIG. 2) can receive user's voice for the next part of the song to continue the process.

The steps of FIG. 13 can be performed by portable electronic device 106 (FIG. 1), electronic device 306 (FIG. 3), host device 302 (FIG. 3), or any other suitable device or any combination of such devices.

The order in which the steps of the present methods are performed is purely illustrative in nature. In fact, the steps can be performed in any order or in parallel, unless otherwise indicated by the present disclosure. The various elements of the described embodiments can be exchanged/mixed, unless otherwise indicated by the present disclosure. The invention can be embodied in other specific forms without departing from the spirit or essential characteristics thereof. The foregoing embodiments are each therefore to be considered in all respects illustrative, rather than limiting of the invention. Thus, the present invention is only limited by the claims which follow.

What is claimed is:

1. A method for assisting a user performing karaoke, comprising:

receiving the user's voice signals;

comparing the user's voice signals with expected voice signals;

determining whether the user is singing on key/pitch based on the comparison;

generating an altered version of the user's voice signals based on the determination; and providing real-time feedback comprising the altered version of the user's voice signals to the user while the user is still performing karaoke, wherein generating comprises generating the altered version of the user's voice signals by exaggerating the user's voice signals based on the comparison when it is determined that the user is singing off key/pitch.

2. The method defined in claim 1, wherein comparing comprises:

calculating the difference in pitch between the user's voice signals and the expected voice signals.

3. The method defined in claim 2, wherein the expected voice signals are based on melody/harmony information from as-recorded music.

4. The method defined in claim 2, wherein the expected voice signals are based on melody/harmony information from vocals of an artist.

5. The method defined in claim 2, wherein exaggerating comprises exaggerating the user's voice signals based on the calculated difference in pitch between the user's voice signals and the expected voice signals.

6. The method defined in claim 2, wherein the user's voice signals are based on melody/harmony information from vocals received from the user.

7. The method defined in claim 1, wherein providing comprises:

playing audible feedback signals to the user.

8. The method defined in claim 1, wherein providing comprises:

playing positive feedback audible signals when the user is on key/pitch; and playing negative feedback audible signals when the user is off key/pitch.

9. The method defined in claim 1, wherein generating comprises generating the altered version of the user's voice signals by enhancing the user's voice signals when it is determined that the user is singing on key/pitch.

10. The method defined in claim 1, wherein generating comprises generating the altered version of the user's voice signals by enhancing the user's voice signals with an echo when it is determined that the user is singing on key/pitch.

11. The method defined in claim 1, wherein exaggerating comprises exaggerating the off pitchedness of the user's voice signals.

12. The method defined in claim 1, further comprising:

creating a modified version of the user's voice signals when it is determined that the user is singing off key/pitch; and providing the modified version of the user's voice signals to an audience while providing the real-time feedback to the user.

13. The method defined in claim 12, wherein the altered version of the user's voice signals differs from the modified version of the user's voice signals.

14. The method defined in claim 12, wherein creating comprises creating the modified version of the user's voice signals by modifying the pitch of the user's voice signals to the expected voice signals.

15. The method defined in claim 12, wherein creating comprises creating the modified version of the user's voice signals by fuzzing the user's voice signals.

16. A system for assisting a user performing karaoke, comprising control circuitry, an output device and a microphone, wherein the control circuitry comprises processing circuitry and at least one storage device, the control circuitry configured to:

direct the microphone to receive the user's voice signals;

compare the user's voice signals with expected voice signals stored in the at least one storage device;

determine whether the user is singing on key/pitch based on the comparison;

generate an altered version of the user's voice signals based on the determination; and direct the output device to provide real-time feedback comprising the altered version of the user's voice signals to the user while the user is still performing karaoke, wherein the control circuitry is configured to generate the altered version of the user's voice signals by exaggerating the user's voice signals based on the comparison when it is determined that the user is singing off key/pitch.

17. The system defined in claim 16, wherein the control circuitry is further configured to:

calculate the pitch difference between the user's voice signals and the expected voice signals.

18. The system defined in claim 17, wherein the user's voice signals are based on melody/harmony information from vocals received from the user.

19. The system defined in claim 17, wherein the expected voice signals are based on melody/harmony information extracted from as-recorded music.

20. The system defined in claim 17, wherein the expected voice signals are based on melody/harmony information from the vocals of an artist.

21. The system defined in claim 17, wherein the control circuitry is configured to exaggerate the user's voice signals by exaggerating the user's voice signals based on the calculated pitch difference between the user's voice signals and the expected voice signals.

22. The system defined in claim 16, wherein the output device comprises an audio output device, and wherein the control circuitry is further configured to:

direct the audio output device to play audible feedback signals to the user comprising the altered version of the user's voice signals.

23. The system defined in claim 16, wherein the output device comprises an audio output device, and wherein the control circuitry is further configured to:

direct the audio output device to play positive feedback audible signals comprising the altered version of the user's voice signals when the user is on key/pitch; and direct the audio output device to play negative feedback audible signals comprising the altered version of the user's voice signals when the user is off key/pitch.

24. The system of claim 16, wherein the control circuitry is configured to generate the altered version of the user's voice signals by enhancing the user's voice signals when it is determined that the user is singing on key/pitch.

25. The system of claim 16, wherein the control circuitry is configured to generate the altered version of the user's voice signals by enhancing the user's voice signals with an echo when it is determined that the user is singing on key/pitch.

26. The system defined in claim 16, wherein the control circuitry is configured to exaggerate the user's voice signals by exaggerating the off pitchedness of the user's voice signals.

27. The system defined in claim 16 further comprising speakers, wherein the control circuitry is further configured to:

create a modified version of the user's voice signals when it is determined that the user is singing off key/pitch; and direct the speakers to provide the modified version of the user's voice signals to an audience while directing the output device to provide the real-time feedback to the user.

28. The system defined in claim 27, wherein the altered version of the user's voice signals differs from the modified version of the user's voice signals.

29. The system defined in claim 27, wherein the control circuitry is configured to create the modified version of the user's voice signals by modifying the pitch of the user's voice signals to the expected voice signals.

30. The system defined in claim 27, wherein the control circuitry is configured to create the modified version of the user's voice signals by fuzzing the user's voice signals.

31. A system for assisting a user performing karaoke, comprising a user device and a host device remote to the user device, the host device comprising control circuitry and communications circuitry, wherein the control circuitry comprises processing circuitry and at least one storage device, the control circuitry configured to:

direct the communications circuitry to receive the user's voice signals from the user device;

compare the user's voice signals with expected voice signals stored in the at least one storage device;

determine whether the user is singing on key/pitch based on the comparison;

generate an altered version of the user's voice signals based on the determination; and direct the communications circuitry to transmit real-time feedback comprising the altered version of the user's voice signals to the user device while the user is still performing karaoke, wherein the control circuitry is configured to generate the altered version of the user's voice signals by exaggerating the user's voice signals based on the comparison when it is determined that the user is singing off key/pitch.

32. The system defined in claim 31, wherein the control circuitry is further configured to:

calculate the difference in pitch between the user's voice signals and the expected voice signals.

33. The system defined in claim 32, wherein the user's voice signals are based on melody/harmony information from vocals received from the user.

34. The system defined in claim 32, wherein the expected voice signals are based on melody/harmony information from as-recorded music.

35. The system defined in claim 32, wherein the expected voice signals are based on melody/harmony information from vocals of an artist.

36. The system defined in claim 32, wherein the control circuitry is configured to exaggerate the user's voice signals by exaggerating the user's voice signals based on the calculated difference in pitch between the user's voice signals and the expected voice signals.

37. The system defined in claim 31, wherein the control circuitry is further configured to:

direct the communications circuitry to transmit positive feedback audible signals comprising the altered version of the user's voice signals to the user device when the user is on key/pitch; and direct the communications circuitry to transmit negative feedback audible signals comprising the altered version of the user's voice signals to the user device when the user is off key/pitch.

38. The system defined in claim 31, wherein the control circuitry is configured to generate the altered version of the user's voice signals by enhancing the user's voice signals when it is determined that the user is singing on key/pitch.

39. The system defined in claim 31, wherein the control circuitry is configured to generate the altered version of the user's voice signals by enhancing the user's voice signals with an echo when it is determined that the user is singing on key/pitch.

40. The system defined in claim 31, wherein the control circuitry is configured to exaggerate the user's voice signals by exaggerating the off pitchedness of the user's voice signals.

41. The system defined in claim 31 further comprising speakers, wherein the control circuitry is further configured to:

create a modified version of the user's voice signals when it is determined that the user is singing off key/pitch; and direct the communications circuitry to transmit the modified version of the user's voice signals to the speakers while directing the communications circuitry to transmit the real-time feedback to the user device.

42. The system defined in claim 41, wherein the altered version of the user's voice signals differs from the modified version of the user's voice signals.

43. The system defined in claim 41, wherein the control circuitry is configured to create the modified version of the user's voice signals by modifying the pitch of the user's voice signals to the expected voice signals.

44. The system defined in claim 41, wherein the control circuitry is configured to create the modified version of the user's voice signals by fuzzing the user's voice signals.

* * * * *